United States Patent [19]

Gogarty

[11] Patent Number: 4,529,197
[45] Date of Patent: Jul. 16, 1985

[54] DUMBBELL, ADJUSTABLE, AND LOCKING MEANS

[76] Inventor: Brian J. Gogarty, 8546 Fernald, Morton Grove, Ill. 60053

[21] Appl. No.: 539,151

[22] Filed: Oct. 5, 1983

[51] Int. Cl.³ .............................................. A63B 11/00
[52] U.S. Cl. .................................... 272/122; 272/123; 272/DIG. 4; 403/4; 403/261
[58] Field of Search ............... 272/122, 123, 118, 117, 272/93, 127, 134; 403/4, 258, 261

[56] References Cited

U.S. PATENT DOCUMENTS

| | | | |
|---|---|---|---|
| 1,645,457 | 10/1927 | Schall | 272/123 X |
| 1,991,520 | 6/1933 | Postl | 272/122 |
| 2,470,815 | 3/1948 | Harvey | 272/123 |
| 3,488,051 | 1/1970 | Papistas-Scherer | 272/122 |
| 3,771,785 | 11/1973 | Speyer | 272/123 |
| 4,453,710 | 6/1984 | Plötz | 272/122 |

Primary Examiner—Richard J. Apley
Assistant Examiner—Robert W. Bahr
Attorney, Agent, or Firm—Paul H. Gallagher

[57] ABSTRACT

A dumbbell including a bar having at each end a plurality of longitudinal grooves, of different lengths, closed at their inner ends and opening at their outer ends into a cross groove. The cross groove is defined on its outer edge by a rib at the end edge of the bar. An inlet groove opens through the end of the bar, and lets into the adjacent longitudinal groove. An inner collar slides on the bar, having a dowel pin riding in the grooves and positionable in a selected groove to accommodate a corresponding number of weights. A square headed bolt threads into the end of the bar, and the locking collar has a square hole enabling it to be slid over the bolt head, and a square socket coincident with the hole, receiving the bolt head upon turning the collar 45°, and the collar can then rotate the bolt. Another form includes a locking collar having a keyhole slot to enable the collar to be removed over the bolt head that normally holds it in place, and in still another form, the locking collar has a radial slot opening through its periphery, to enable the collar to be removed without removing the bolt.

14 Claims, 10 Drawing Figures

DUMBBELL, ADJUSTABLE, AND LOCKING MEANS

FIELD OF THE INVENTION

Dumbbells, basically, are produced with each individually having a particular size, and if a user wished to use bells of different weights, he would use separate ones. Attempts have been made to produce adjustable dumbbells, in the use of which a greater or lesser number of weights could be incorporated in an individual dumbbell, but they have not been completely successful.

The invention in its broad scope includes a locking device in which an element thereof is utilized for locking elements in place, and can itself be used as a tool for performing the locking and unlocking functions, eliminating the need for an extra tool.

OBJECTS OF THE INVENTION

A broad object of the invention is to provide a novel adjustable dumbbell having the following features and characteristics:

1. Weights can be removed and replaced without the use of tools other than elements making up the dumbbell.

2. The adjustable elements for locking the weights in place are put in fixed position for locking without marring the bar.

3. The adjustable elements for locking the weights in place can be easily and quickly put in selected positions according to the number of weights utilized, and with utmost accuracy.

4. The bar is made of metal dissimilar from that of the other elements, whereby to eliminate welding characteristic of like metals, whereby to facilitate replacement of the other elements on the bar.

5. The invention in its broad aspects, includes the locking of items together in an assembly, enabling one of the items to be used as a tool in locking and unlocking, thereby eliminating the need for a special tool, another tool, for that purpose.

DESCRIPTION OF A PREFERRED EMBODIMENT

Figure 1:
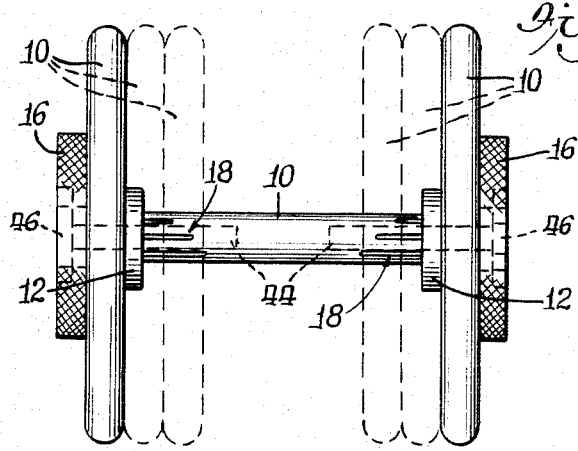
FIG. 1 is a side view of the dumbbell incorporating the features of the invention.
Figure 2:
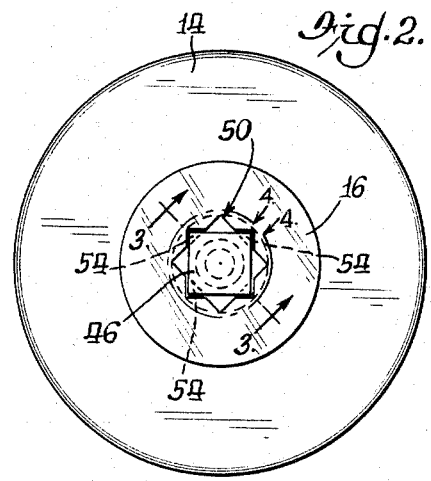
FIG. 2 is an end view.
Figure 3:
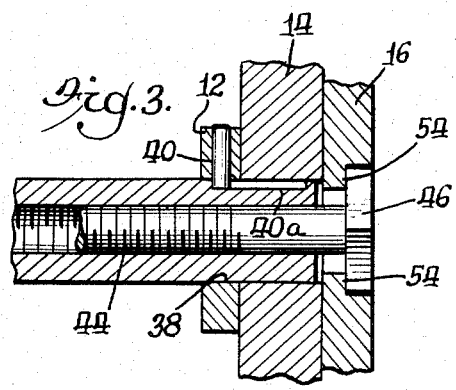
FIG. 3 is a sectional view taken at line 3—3 of FIG. 2.
Figure 4:
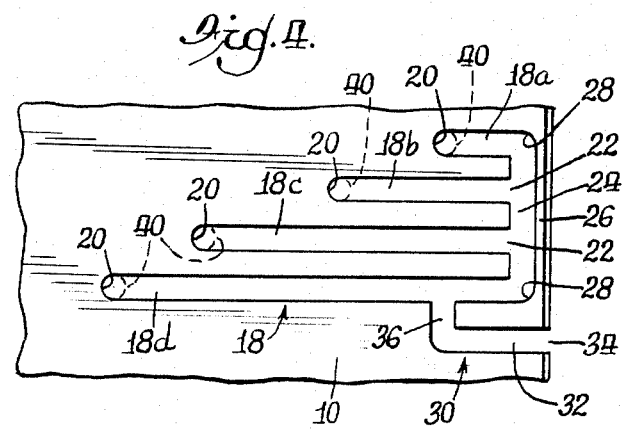
FIG. 4 is a developed view taken on the curved line 4—4 of FIG. 2.

Referring in detail to the accompanying drawings, the dumbbell embodying the features of the invention is shown in its entirety in elevational view in FIG. 1, and includes as the main components thereof a bar 10, an inner collar 12, weights 14 and a locking collar 16.

The dumbbell includes a set of the elements on each end of the bar, which are identical or symmetrical and a description of one of the sets will suffice for both.

The bar 10 is in the form of a round shaft or rod and includes a set of grooves or slots 18 at each end thereof, these grooves including a plurality of individual dimensions and locations. The grooves include a plurality, 18a, 18b, 18c, 18d, of different lengths, extending longitudinally or axially of the bar, having their inner ends closed as at 20 and their outer ends open as at 22. The open ends of the grooves 18 open into and communicate with a cross groove 24 extending circumferentially of the bar, and defined at its longitudinal outer side edge by a rib 26 at the end edge of the bar. This cross groove 24 terminates its ends at the circumferentially far edges of the respective side grooves, 18a, 18b, as indicated at 28.

In addition to the grooves 18, is a groove 30 which may be termed an inlet groove, or an outlet groove, and includes a main segment 32 extending longitudinally or axially of the bar and opening out through the end of the bar as indicated at 34. The groove 30 also includes a cross segment 36 which communicates between the segment 32 and the next adjacent groove 18b. This segment 36 is located longitudinally inwardly of the cross groove 24. The grooves 18, 30, are for the purpose of accommodating the various adjusted positions of the inner collar 12, as described in detail hereinbelow.

The inner collar 12 may be a simple round disc, of annular form, having a central hole 38 dimensioned for receiving the bar 10, and enabling free rotation and longitudinal sliding of the collar on the bar. A dowel pin 40 is press fitted in an aperture in the inner collar, with its inner end 40a projecting into the central hole 38 and into various ones of the grooves 18, 24, 30 as referred to again hereinbelow.

The weights 14 may be all identical, and may be of any suitable size and mass, or combination thereof, and are preferably simple round discs with central holes, fitted on the bar. The weights are referred to again herein-below.

The locking collar 16 cooperates with a securing means 42, and in the preferred form, the securing means 42 is in the form of a simple threaded bolt having a shank 44 and a polygonal head 46, for example square. The bolt head 46 in its greatest transverse dimension, i.e., diagonal dimension, is no greater than the diameter of the bar, and may be less than that dimension.

The locking collar 16 is preferably circular, and has a central hole 48 therethrough, of the same polygonal shape as the bolt head, square, and dimensioned for slidably receiving the bolt head, although preferably without appreciable play therebetween. The corners of the hole are indicated at 49.

The locking collar 16 is also provided with a socket 50 coaxial with the hole, and of the same perimeter shape, i.e., square, having corner niches 52 located between the corners of the hole. These niches open outwardly through the outer surface of the locking collar, but are shallow and do not open through the inner surface of the collar, forming ledge elements 54 at the bottom of the niches. These niches, for a purpose to be referred to again below, are of a depth equal to the depth, or axial dimension, of the bolt head 46, and of course less than the depth, or thickness of the locking collar.

The inner collar 12 accommodates one or a plurality of weights 14, and for that purpose is positionable at different positions longitudinally or axially of the bar, according to the number of weights to be accommodated. Also this inner collar is removable from the bar. As a starting point, with nothing mounted on the bar, in assembling the elements, the inner collar 12 is fitted on the end of the bar and the dowel pin 40 positioned in alignment with the entry groove segment 32, and the collar slid further onto the shaft with the dowel pin riding in that groove; after the dowel pin reaches the inner end of the groove, the collar is rotated to carry the dowel pin through the groove segment 36 and in this case into the groove 18d. The collar is then slid longitudinally outwardly until the dowel pin moves into the cross groove 24 and it is then rotated to position the dowel pin in register with the particular one of the grooves 18 according to the number of weights to be accommodated. In one such step, and to accommodate a single weight, the collar is positioned with the dowel pin in register with the short groove 18a and then the collar slid further onto the bar until the dowel pin engages the inner end of that groove. Then the weight is put on the shaft. The dimensions of the various elements are such that when the collar and weight are so positioned, the outer surface of the weight is at least as far out, longitudinally, as the outer end surface of the bar, and usually therebeyond. The locking collar 16 is then put on and locked, in the manner referred to below, and in doing so the weight is preloaded and locked against the inner collar 12.

To accommodate other numbers of weights, the inner collar is rotated selectively to different positions with the dowel pin in alignment with the different grooves 18, that is, for two weights in alignment with the groove 18b, for three weights in alignmemt with the groove 18c, and for four weights in alignment with the groove 18d. It will be appreciated that the lengths of these grooves 18 are dimensioned for that purpose, and whatever number of weights is utilized, the outermost weight, when they are all in position, is positioned relative to the end of the bar as was mentioned above in connection with one weight.

The provision of the cross groove 24 and the rib 26 outwardly thereof facilitates positioning of the inner collar according to the desired groove 18, i.e., the collar can be rotated freely without fear of its coming off of the bar, until the dowel pin registers with the desired groove and then the collar slid further onto the bar. The positioning of the groove 30, separated from the other grooves 18, enables removal and replacement of the collar in a move independent of aligning the dowel pin with the grooves 18, and the positioning of the transverse segment 36 longitudinally inwardly beyond the cross groove 24 eliminates interfering with the cross groove 24 but still facilitates removal of the collar. Additionally the provision of the rib 26 provides added strength to the bar at the end thereof, providing body to better support the weight that is positioned thereover.

Figure 5:
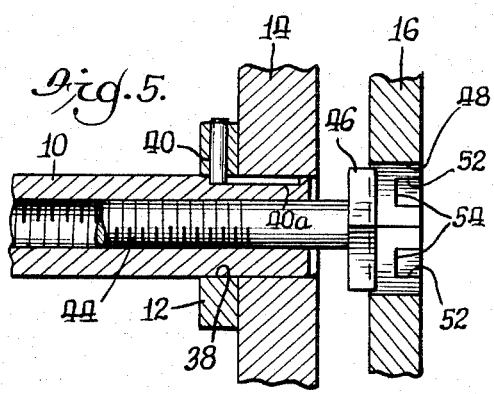
FIG. 5 is a view similar to FIG. 3 but showing the parts in a different position.
Figure 6:
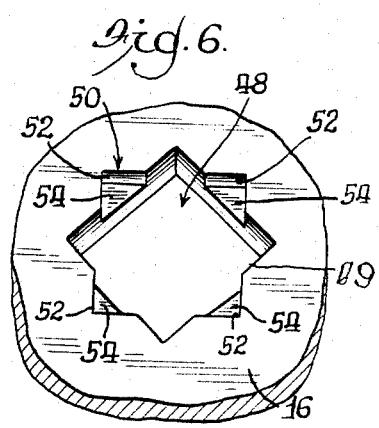
FIG. 6 is a fragmentary perspective view of the locking member.

The locking collar 16 and the securing means 44 constitute means, the equivalent of a tool, for locking the weights in place, and releasing them, without the requirement for an independent tool or special tool. In applying the locking collar 16, the bolt 44 is at that time slightly backed out of the bar as indicated in FIG. 5, and the locking collar fitted thereover, with the bolt head passing through the hold 48. The locking collar is so applied, i.e., moves longitudinally or axially, until the ledge elements 52 are beyond the bolt head, and then the locking collar is rotated 45° to the position in which the corners of the bolt head are in register with the niches 52 and then the collar is backed off until the bolt head fits into the niches. The ledge elements 54 engage the bolt head, preventing the collar from being withdrawn, and the niches, forming a recess, receive the bolt head; the collar is then rotated, rotating the bolt with it, and threading the bolt into the bar, to tight position. In such position the ledges 52 are gripped or clamped between the bolt head and the remainder of the assembly. As noted above the outer surface of the adjacent weight preferably extends outwardly beyond the end of the bar, so that the locking bolt engages the weight and grips it tightly. A single weight, or a plurality of weights are then gripped in tight position, without play, and annoying rattling.

Figure 7:
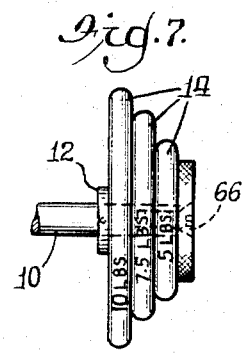
FIG. 7 is a view of one end of the dumbbell including weights of different sizes.

The construction enables the inclusion of different sets or groups of weights at each end. A single weight may be used, or a plurality of them. The weights used may be all of the same mass, or of different masses. For example, as shown in FIG. 7, bigger weights may be placed in position first, followed by continuously smaller ones, forming a cone shape arrangement with the locking collar.

Preferably, the bar is made of different metal from that of the other elements, thus preventing welding of metals of the same kind. This is particularly significant in cases as this one, where adjustments or changes may be made often. For example, the bar may be made of aluminum or soft steel, and the other elements of hard steel.

The construction avoids marring or other misshaping of the bar, as sometimes occurs when set screws are used to grip into the bar, and regardless which location the inner collar is positioned in, it can be removed therefrom and again replaced in that same position with complete accuracy of positioning, in all cases.

Heretofore the element corresponding to the locking collar 16, was locked by a bolt or set screw threaded therethrough and it was necessary to use an extra tool to remove it in order to remove the locking collar and thus the weights. In the present instance, no such extra tool is required, but the locking collar 16 itself serves as a tool.

An important feature is the fact that the end of the dumbbell is defined by the outer surface of the locking collar, regardless of the number of weights on the bar. The construction eliminates the extension of the bar out beyond the weights and the locking collar, which was cumbersome, and sometimes dangerous. The arrangement enables the dumbbell to be stood on end, in stable position.

The invention is not limited to any particular dimensions of the various elements, but the following are examples of practical sizes: bar $1\frac{1}{8}''$ diameter and 10" long; inner collar, $\frac{1}{2}''$ thick, 2" diameter; weights, 10 lb., 0.8" thick, 8.34" diameter, $2\frac{1}{2}$ lb., 0.6" thick, 5.1" diameter; locking collar, $\frac{1}{2}''$ thick, 4.5" diameter.

The device, in the broad aspects of the invention, may be utilized for locking and assembly of elements together, i.e., not limited to a dumbbell, in which a secure means such as the bolt 44 is manipulated by another element of the assembly, corresponding to the locking collar 16. Thus the position of such locking means, without the requirement for an extra tool, is provided.

Figure 8:
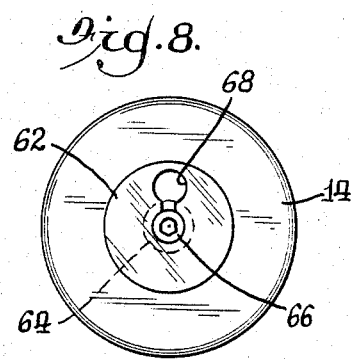
FIG. 8 is a view oriented according to FIG. 2 showing an alternate form of locking means.

As an alternate form, and constituting a construction in which a locking collar such as the collar 16 need not be completely removed, attention is directed to FIG. 8. In this case the numeral 60 indicates a dumbbell with an assemblage of elements, including a locking collar 62 serving the purpose of the collar 16. In the present case the collar 62 is held on the bar 64 by a set screw, such as an allen head screw 66. The locking collar 62 is provided with a keyhole slot 68, and upon backing off of the screw 66 sufficiently to enable the locking collar to slide, the collar is so slid and the keyhold slot is dimensioned for enabling removal of the locking collar over the screw head.

Figure 9:
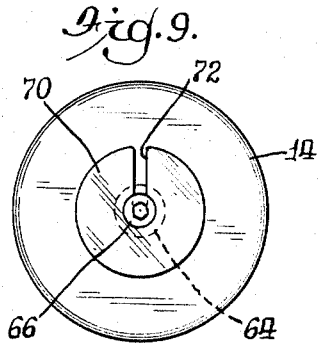
FIG. 9 is a view similar to FIG. 7 and showing an additional modified form.
Figure 10:
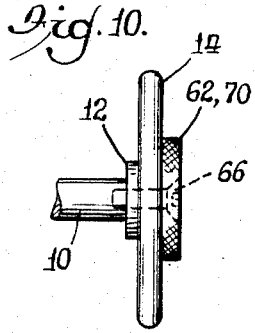
FIG. 10 is a side view from the side of each FIGS. 8 and 9.

FIG. 9 shows a construction similar to that of FIG. 7, including a locking collar 70 having a radial slot 72 opening through the edge of the collar. When the screw 66 is backed off, the collar is removed by simply sliding it transversely.

The forms of FIGS. 8 and 9 also have broad surfaces on the ends, as determined by the locking collars, 62, 70, the flat allen head screws being flush with those surfaces.

I claim:

1. An adjustable dumbbell comprising,
  a bar having a set of grooves at each end, each set including a plurality thereof extending longitudinally and spaced apart circumferentially, the grooves being of different lengths, closed at their inner ends and open at their outer ends,
  an inner collar rotatable, and longitudinally slidable, on the bar, and having a radially inwardly directed pin extendible selectively into the grooves,
  at least one removable weight outwardly of the inner collar,
  a removable locking collar on the bar outwardly of the weight,
  means for locking the foregoing items together.

2. A dumbbell according to claim 1 wherein,
  the bar is provided with a cross groove adjacent each end communicating with the longitudinal grooves, and itself opening outwardly, beyond the end of the bar.

3. A dumbbell according to claim 2 wherein,
  the bar is provided with an inlet groove independent of the other grooves and communicating with the cross groove.

4. A dumbbell according to claim 3 wherein,
  the cross groove is closely adjacent the end of the bar, and its ends register with the circumferentially outer surfaces of the outer longitudinal grooves, and
  the inlet groove has a main segment disposed longitudinally, with its outer end opening through the end of the bar, and its inner end extending beyond the cross groove, and including a transverse segment communicating with the adjacent longitudinal groove.

5. A dumbbell according to claim 1 wherein,
  the difference in length of adjacent longitudinal grooves is equal to the thickness of a weight, whereby in each position of the inner collar, as determined by the respective groove, and the presence of a corresponding number of weights, the outer surface of the outer weight is positioned longitudinally at least as far as the end surface of the bar, and the locking collar is capable of engaging the outer weight in locking effect.

6. A dumbbell according to claim 1 wherein,
  the locking means includes a securing element separate from the other items, and the construction and arrangement are such as to enable removal and replacement of the locking collar and of weights without removal of the securing element.

7. A dumbbell according to claim 6 wherein,
  the securing element is contained within the transverse limits of the bar,
  the locking collar is removable from the bar without removal of the securing element, and
  the weights are removable from the bar, upon removal of the locking collar, over the securing element.

8. A dumbbell according to claim 7 wherein,
  the locking collar is provided with a key hole slot enabling it to be removed over the securing element.

9. A dumbbell according to claim 7 wherein,
  the locking collar is provided with a radial slot opening through its periphery enabling it to be removed transversely without removing the securing element.

10. A dumbbell according to claim 1 wherein,
  the bar is made of metal dissimilar from that of the other elements whereby to prevent welding characteristic of similar metals and thereby facilitate removal of said other elements from the bar and replacement thereon.

11. An adjustable dumbbell comprising,
  a bar,
  an inner collar on the bar and selectively positionable thereon,
  at least one weight on the bar outwardly of the inner collar,
  a securing element removably positioned in the end of the bar and contained within the transverse dimensions of the bar, and
  a locking member having a central hole receiving the outer end of the securing element, and the hole being constructed such that in one position of the locking member, the locking member will pass over the securing element and in another position, the hole forms a socket receiving the securing element and pursuant to such reception, the locking member is manipulable for tightening the securing element and the locking member is of greater dimensions than the bar and thereby operable for engaging the weight, and locking it in position, in response to tightening the securing element.

12. A dumbbell according to claim 11 wherein,
  the securing element is a bolt threaded into the bar and having a polygonal head, and
  the locking member has a hole therethrough of polygonal shape corresponding to that of the bolt head, and a socket of the same polygonal shape having corner niches between the corners of the hole.

13. Locking means for locking removable items on a bar, comprising,
  an inner collar on the bar,
  a manipulable securing element in the end of the bar, contained within the transverse dimensions of the bar whereby to enable the removal of items to be moved thereover, and a locking member having a central hole receiving the outer end of the securing element and the hole being constructed such that in one position of the locking member the locking member will pass over the securing element and in another position, the hole forms a socket receiving the securing elements, and pursuant to such reception, the locking member is manipulable for tightening the securing element, and the locking member is of greater dimensions than the bar and thereby operable for engaging the weight, and locking it in position, in response to tightening the securing element.

14. Locking means according to claim 13 wherein;
the securing element is a bolt threaded into the bar and having a polygonal head, and
the locking member has a hole therethrough of polygonal shape corresponding to that of the bolt head,
and a socket of the same polygonal shape having corner niches between the corners of the hole.

* * * * *